United States Patent
Shi et al.

(10) Patent No.: US 9,992,676 B2
(45) Date of Patent: Jun. 5, 2018

(54) METHOD FOR UNLOCKING ADMINISTRATION AUTHORITY AND DEVICE FOR AUTHENTICATION

(71) Applicant: Xiaomi Inc., Beijing (CN)

(72) Inventors: Dalong Shi, Beijing (CN); Jinbin Lin, Beijing (CN); Kun Ma, Beijing (CN)

(73) Assignee: XIAOMI INC., Beijing (CN)

( * ) Notice: Subject to any disclaimer, the term of this patent is extended or adjusted under 35 U.S.C. 154(b) by 162 days.

(21) Appl. No.: 14/829,323

(22) Filed: Aug. 18, 2015

(65) Prior Publication Data

US 2016/0165442 A1 Jun. 9, 2016

Related U.S. Application Data

(63) Continuation of application No. PCT/CN2015/078017, filed on Apr. 30, 2015.

(30) Foreign Application Priority Data

Dec. 5, 2014 (CN) .......................... 2014 1 0742966

(51) Int. Cl.
*G06F 7/04* (2006.01)
*G06F 15/16* (2006.01)
(Continued)

(52) U.S. Cl.
CPC ............ *H04W 12/06* (2013.01); *G06F 21/40* (2013.01); *H04L 9/085* (2013.01); *H04W 4/02* (2013.01);
(Continued)

(58) Field of Classification Search
CPC ............... H04W 12/06; H04L 63/0876; H04L 63/0853; H04L 9/0872; H04L 63/0492; H04L 63/083
See application file for complete search history.

(56) References Cited

U.S. PATENT DOCUMENTS 5,901,284 A * 5/1999 Hamdy-Swink ........ H04L 29/06
340/5.74
8,126,450 B2 * 2/2012 Howarter ............ B60R 25/2009
455/420
(Continued)

FOREIGN PATENT DOCUMENTS

CN 102905262 A 1/2013
CN 103378876 A 10/2013
(Continued)

OTHER PUBLICATIONS

Extended European Search Report dated Mar. 30, 2016 for European Application No. 15198096.8, 8 pages.
(Continued)

*Primary Examiner* — Jayesh M Jhaveri
(74) *Attorney, Agent, or Firm* — Arch & Lake LLP

(57) ABSTRACT

The embodiments of the present disclosure relate to a method for unlocking administration authority and a device for performing authentication, and pertain to the technical field of computer information security. In the method, the authentication device receives authentication information sent by a plurality of member devices. The member devices include a mobile terminal or a wearable device. The authentication device performs a matching authentication of the authentication information by matching authentication information sent from a member device with authentication information prestored in an authorized authentication information list, and determines a distance between an authenticated member device and the authentication device. Then, the authentication device unlocks local administration authority if the number of authenticated member devices that are located within a predetermined distance threshold from the authentication device reaches a predetermined number threshold.

20 Claims, 4 Drawing Sheets

(51) Int. Cl.
| | |
|---|---|
| *G06F 17/30* | (2006.01) |
| *H04L 29/06* | (2006.01) |
| *H04W 12/06* | (2009.01) |
| *G06F 21/40* | (2013.01) |
| *H04L 9/08* | (2006.01) |
| *H04W 4/02* | (2018.01) |
| *H04W 4/00* | (2018.01) |

(52) U.S. Cl.
CPC ........ *H04L 9/0872* (2013.01); *H04L 63/0492* (2013.01); *H04L 63/083* (2013.01); *H04L 63/0853* (2013.01); *H04L 63/0876* (2013.01); *H04W 4/008* (2013.01); *H04W 4/023* (2013.01)

(56) References Cited

U.S. PATENT DOCUMENTS

| | | | |
|---|---|---|---|
| 8,208,943 | B2 | 6/2012 | Peterson et al. |
| 8,601,061 | B2 | 12/2013 | Piccinini et al. |
| 8,905,303 | B1* | 12/2014 | Ben Ayed ............ G06Q 20/223 235/375 |
| 2003/0014649 | A1* | 1/2003 | Funahashi ........... G07C 9/00087 713/186 |
| 2004/0088549 | A1 | 5/2004 | Ukai et al. |
| 2005/0278776 | A1 | 12/2005 | Kitagawa et al. |
| 2008/0219227 | A1* | 9/2008 | Michaelis ............. H04L 12/189 370/338 |
| 2011/0093939 | A1 | 4/2011 | Barbour et al. |
| 2011/0313922 | A1* | 12/2011 | Ben Ayed ............ G06Q 20/108 705/42 |
| 2012/0098639 | A1 | 4/2012 | Ijas |
| 2012/0246074 | A1 | 9/2012 | Annamalai et al. |
| 2013/0018951 | A1 | 1/2013 | Piccinini et al. |
| 2014/0127994 | A1 | 5/2014 | Nightingale et al. |
| 2014/0156993 | A1 | 6/2014 | Yau |
| 2014/0189350 | A1 | 7/2014 | Baghdasaryan et al. |
| 2014/0189785 | A1* | 7/2014 | Castro .................. H04L 63/105 726/1 |
| 2014/0364085 | A1* | 12/2014 | Garcia ................. H04W 12/08 455/411 |
| 2015/0291129 | A1* | 10/2015 | Saito ...................... G06F 21/35 455/411 |
| 2015/0304851 | A1* | 10/2015 | Chen ..................... H04W 12/08 713/172 |

FOREIGN PATENT DOCUMENTS

| | | |
|---|---|---|
| CN | 103425413 A | 12/2013 |
| CN | 103488932 A | 1/2014 |
| CN | 103914038 A | 7/2014 |
| CN | 103944615 A | 7/2014 |
| CN | 104092817 A | 10/2014 |
| CN | 104573473 A | 4/2015 |
| EP | 1536380 A1 | 6/2005 |
| EP | 1564928 A1 | 8/2005 |
| JP | 2001318839 A | 11/2001 |
| JP | 2004289208 A | 10/2004 |
| JP | 2005323092 A | 11/2005 |
| JP | 2005352710 A | 12/2005 |
| JP | 2006178591 A | 7/2006 |
| JP | 2006350726 A | 12/2006 |
| JP | 2007027955 A | 2/2007 |
| JP | 2007312180 A | 11/2007 |
| JP | 2010113538 A | 5/2010 |
| JP | 2011004214 A | 1/2011 |
| JP | 2012039313 A | 2/2012 |
| JP | 2013190900 A | 9/2013 |
| JP | 2013191209 A | 9/2013 |
| KR | 10-0748034 | 8/2007 |
| KR | 20080022475 A | 3/2008 |
| RU | 2409853 C2 | 1/2011 |
| WO | WO 2014/165230 A1 | 10/2014 |

OTHER PUBLICATIONS

International Search Report dated Aug. 26, 2015 for International Application No. PCT/CN2015/078017, 7 pages.
Notification of Reasons for Refusal issued in corresponding Japanese Patent Application No. 2016-562058, dated Sep. 19, 2017, 13 pages.
Office Action for Korean patent application No. 520130487991 dated Jun. 27, 2016, 6 pages.
Office Action for Russian patent application No. 2015133293 dated Nov. 24, 2016, 14 pages.
Notice of Allowance for Korean patent application No. 520130487991 dated Nov. 18, 2016, 3 pages.
Office Action for Japanese patent application No. 2016-562058 dated Dec. 22, 2016, 5 pages.
European Examination Report for Application No. 15198096.8 dated Apr. 24, 2017, 6 pages.
Office Action for Chinese patent application No. 201410742966.2 dated Apr. 2, 2017, 8 pages.

* cited by examiner

METHOD FOR UNLOCKING ADMINISTRATION AUTHORITY AND DEVICE FOR AUTHENTICATION

CROSS-REFERENCE TO RELATED APPLICATIONS

This application is a Continuation Application of International Application PCT/CN2015/078017, with an international filing date of Apr. 30, 2015, which is based on and claims priority to Chinese Patent Application No. 201410742966.2, filed on Dec. 5, 2014, the entire contents of which are incorporated herein by reference.

TECHNICAL FIELD

The present disclosure generally relates to the technical field of computer information security, and more particularly, to a method for unlocking administration authority and a device for performing authentication.

BACKGROUND

The statements in this section merely provide background information related to the present disclosure and may not constitute prior art.

With rapid development of computer technology, the computer is widely used and has become an indispensable tool in daily life. Increasing attention is paid to data security of a computer system, for example, by providing locking and unlocking functions of system administration authority.

Generally, under a locking state of administration authority, a user is unable to operate a system and the system may be provided with an administration authority unlocking page (for example, system identity authentication page) on which the user may input an account and a password. The administration authority may be unlocked in case of a successful authentication, and the user may operate the system. Regarding some systems with higher security level, a password may be segmented into multiple segments in the charge of different administrators. When it is necessary to operate the system, these administrators in charge need to respectively input password segments in sequence so as to unlock administration authority. This method may effectively improve system security.

SUMMARY

The present disclosure provides a method for unlocking administration authority and an authentication device. The technical solution is as below.

In a first aspect of the present disclosure, a method for unlocking administration authority is provided. The method includes: receiving authentication information sent by a plurality of member devices including a mobile terminal or a wearable device; performing a matching authentication of the authentication information by matching authentication information sent from a member device with authentication information prestored in an authorized authentication information list; determining a distance between an authenticated member device and the authentication device; and unlocking local administration authority if the number of authenticated member devices that are located within a predetermined distance threshold from the authentication device reaches a predetermined number threshold.

In a second aspect of the present disclosure, an authentication device is provided. The authentication device includes receiving circuitry configured to receive authentication information sent by a plurality of member devices; matching circuitry configured to perform a matching authentication of the authentication information by matching authentication information from a member device with authentication information prestored in an authorized authentication information list; distance determining circuitry configured to determine a distance between an authenticated member device and the authentication device; and unlocking circuitry configured to unlock local administration authority if the number of authenticated member devices that are located within a predetermined distance threshold from the authentication device reaches a predetermined number threshold.

In a third aspect of the present disclosure, an authentication device is provided. The authentication device includes a processor; and a memory configured to store instructions executable by the processor. The processor is configured to receive authentication information sent by a plurality of member devices including a mobile terminal or a wearable device; perform a matching authentication of the authentication information by matching authentication information sent from a member device with authentication information prestored in an authorized authentication information list; determine a distance between an authenticated member device and the authentication device; and unlock local administration authority if the number of authenticated member devices that are located within a predetermined distance threshold from the authentication device reaches a predetermined number threshold.

In a fourth aspect of the present disclosure, there is provided a non-transitory computer-readable storage medium having stored therein instructions that, when executed by a processor of an authentication device, causes the authentication device to perform a method for unlocking administration authority. The method comprises: receiving authentication information sent from a plurality of member devices at the authentication device including a mobile terminal or a wearable device; performing a matching authentication of the authentication information by matching authentication information sent from a member device with authentication information prestored in an authorized authentication information list; determining a distance between an authenticated member device and the authentication device; and unlocking local administration authority if the number of the authenticated member devices that are located within a predetermined distance threshold from the authentication device reaches a predetermined number threshold.

It is to be understood that both the foregoing general description and the following detailed description are exemplary and explanatory only and are not restrictive of the disclosure. Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. In accompanying drawings.

Embodiments of the present disclosure are shown by the above drawings, and more detailed description will be made hereinafter. These drawings and text description are not for limiting the scope of conceiving the present disclosure in any way, but for illustrating the concept of the present disclosure for those skilled in the art by referring to embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Embodiment I

Figure 1:
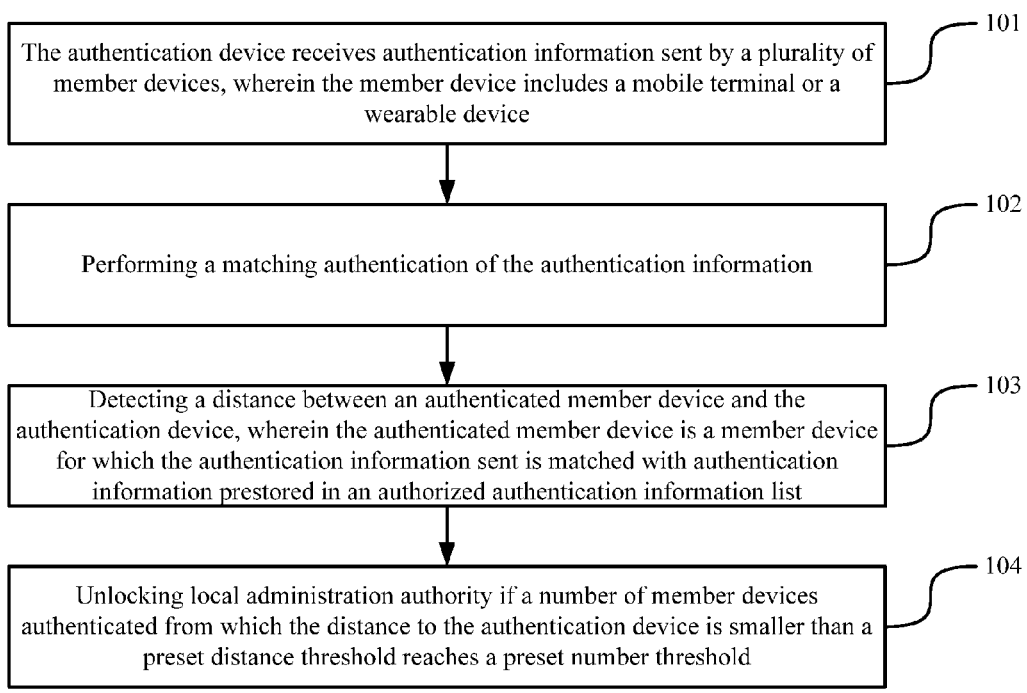
FIG. 1 is a flow chart showing a method for unlocking administration authority according to an exemplary embodiment.

The embodiment of the present disclosure provides a method for unlocking administration authority, as shown in FIG. 1. The method may include the following steps.

In Step 101, an authentication device receives authentication information sent by a plurality of member devices. The member devices may be a mobile terminal or a wearable device. The mobile terminal may include a mobile phone such as smartphone, a tablet computer, a laptop computer, and any other mobile devices that are portable. The wearable device may include a wearable electronic device, for example, a smart wristband, a smart watch, a smart glass, a smart necklace, and any other electronic device that is wearable.

In Step 102, it is performed a matching authentication of the authentication information. The authentication device determines whether the authentication information sent from a member device is matched with authentication information prestored in an authorized authentication information list. If there is a matching, the member device is authenticated.

In Step 103, a distance between an authenticated member device and the authentication device is determined. The authenticated member device is a member device which sent an authentication information that is matched with authentication information prestored in an authorized authentication information list.

In Step 104, local administration authority is unlocked if the number of authenticated member devices that are located within a predetermined distance threshold from the authentication device reaches a predetermined number threshold. The number of authenticated member devices that are located within a predetermined distance threshold can be obtained based on the distance determined in Step 103.

In the embodiments of the present disclosure, the authentication device receives authentication information sent by a plurality of member devices, performs a matching authentication of the authentication information, and determines a distance between an authenticated member device and the authentication device. A member device is authenticated when authentication information sent from the member device is matched with authentication information prestored in an authorized authentication information list. The authentication device unlocks local administration authority if the number of authenticated member devices whose distance to the authentication device is smaller than a predetermined distance threshold reaches a predetermined number threshold. In this way, unlocking administration authority is available as long as a certain number of administrators carrying member devices move close to the authentication device, thus improving the flexibility of unlocking administration authority.

Embodiment II

The embodiment of the present disclosure provides a method for unlocking administration authority, which may be applied to any equipment (referred to as an authentication device) with data management capability. The authentication device may be a desktop computer, or a mobile terminal such as a mobile phone or a tablet computer, or a server group, etc. The member device in the method may be a mobile terminal (such as a mobile phone) or a wearable device and the like. The wearable device may be a wearable electronic device, for example, a smart wristband, a smart watch, or a smart necklace, etc. In the present embodiment, a detailed description is made by taking an example in which the authentication device is a management terminal of a certain company and the member device is a smart wristband, with other conditions similar as stated not repeated herein.

A detailed description of the processing procedure as shown in FIG. 1 is made by combining an implementation mode, with the contents as below.

In Step 101, the authentication device receives authentication information sent by a plurality of member devices.

The authentication information may be unique information of each member device for identity authentication, or may be device identification of the member device, or may be a segment or piece of preset and prestored password.

In implementation, an administrator may carry a member device and move close to the authentication device, and then operate the member device to send the authentication information prestored at the member device to the authentication device. For example, the administrator may click a certain physical button on the member device so as to trigger the member device to send authentication information to the authentication device. In other example, the administrator may initiate a certain application installed in the member device or click a certain button in the application, so as to trigger the member device to send authentication information to the authentication device. In another example, the member device may automatically send authentication information to the authentication device according to a predetermined period cycle. The authentication device may receive authentication information sent by a plurality of member devices.

In one example embodiment, an encryption key may be prestored in the member device, and used to encrypt the authentication information before sending the encrypted authentication information to the authentication device. After receiving the encrypted authentication information, the authentication device may decrypt the encrypted authentication information by using a locally prestored decryption key (constituting a key paired with the encryption key mentioned above), thus acquiring corresponding authentication information.

In other example embodiment, the authentication information may include a device identification of a member device, which may be sent from respective member device to the authentication device by means of a Bluetooth connection message. Accordingly, Step 101 may be executed as below: the authentication device receives a Bluetooth connection message carrying respective device identification sent by a plurality of member devices.

The device identification may be a unique identification of the member device, for example, a MAC (Media Access Control) address.

In implementation, when an administrator wants to unlock administration authority of an authentication device system, the administrator may enable the Bluetooth function of a member device (for example, a smart wristband) for authentication, and then the member device will broadcast a Bluetooth connection message (including device identification of the member device) out periodically. In one example, the administrator moves to the authentication device, during which a Bluetooth connection message (having a certain broadcast scope) of the member device may be received by the authentication device if the authentication device is within the broadcast scope. The authentication device may parse the Bluetooth connection message to obtain the device identification included in the Bluetooth connection message.

In Step 102, it is performed a matching authentication of the authentication information. The authentication device determines whether the authentication information for the member device is matched with authentication information prestored in an authorized authentication information list. The member device is authenticated if the authentication information is matched with authentication information prestored in an authorized authentication information list.

In Step 103, a distance between an authenticated member device and the authentication device is determined.

In implementation, an authorized authentication information list in which authentication information about a plurality of authorized member devices is stored may be established in the authentication device. These member devices may be member devices in the charge of a plurality of administrators with certain authority levels. The authorized authentication information list may be set by the administrators when the authentication device system is at an administration authority unlocking status, and a setting procedure will be described in detail in the subsequent content. After receiving the authentication information sent by the member device, the authentication device may look up the authentication information from the authorized authentication information list stored therein. If the authentication information is found on the authorized authentication information list, it is determined that the matching authentication succeeded, and the member device would be determined as an authenticated member device. And, the distance between the member device and a target terminal such as the authentication device shall be determined. Multiple methods may be used for determining the distance, with a suitable one selected according to actual requirements. The authentication device may deal with each member device sending the authentication information in the way described above. The authentication device may monitor the distance between the authentication device and each member device whose authentication information is included in the authorized authentication information list in real time.

Optionally, the above authentication information may be a device identification of the member device and the member device may send the device identification to the authentication device through a Bluetooth connection message. In this example, the processing procedure of Step 102 may be as below.

Step I: The authentication device automatically replies to the Bluetooth connection message sent by the authenticated member device so as to establish a Bluetooth connection. The authenticated member device is a member device whose device identification is matched with device identification prestored in an authorized authentication information list.

In one example embodiment, device identifications of a plurality of authenticated member devices may be recorded in the authorized authentication information list stored in the authentication device. After receiving a Bluetooth connection message broadcasted by the member device, the authentication device may parse the Bluetooth connection message and obtain the device identification therein, and then look up the device identification from an authorized authentication information list stored locally. If the device identification is found on the authorized authentication information list, a matching authentication is determined as successful and the member device is determined as an authenticated member device. At the moment, the authentication device may automatically generate a Bluetooth feedback message corresponding to the Bluetooth connection message and send the Bluetooth feedback message to the member device. The Bluetooth feedback message may carry the device identification of the authentication device, and a Bluetooth connection may be established between the authentication device and the member device. In this way, a Bluetooth connection may be automatically established between the authentication device and member devices when these member devices whose device identifications are included in the authorized authentication information list are located close to the authentication device.

Step II: the distance between the corresponding authenticated member device and the authentication device is determined by means of the Bluetooth connection established.

In one example embodiment, by using the characteristic of the Bluetooth connection on distance determination, the authentication device may determine the distance between the authentication device and member devices (establishing a Bluetooth connection with the authentication device) based on the intensity of Bluetooth signal.

In Step 104, local administration authority is unlocked if the number of authenticated member devices that are within a predetermined distance threshold from the authentication device reaches a predetermined number threshold.

Figure 2:
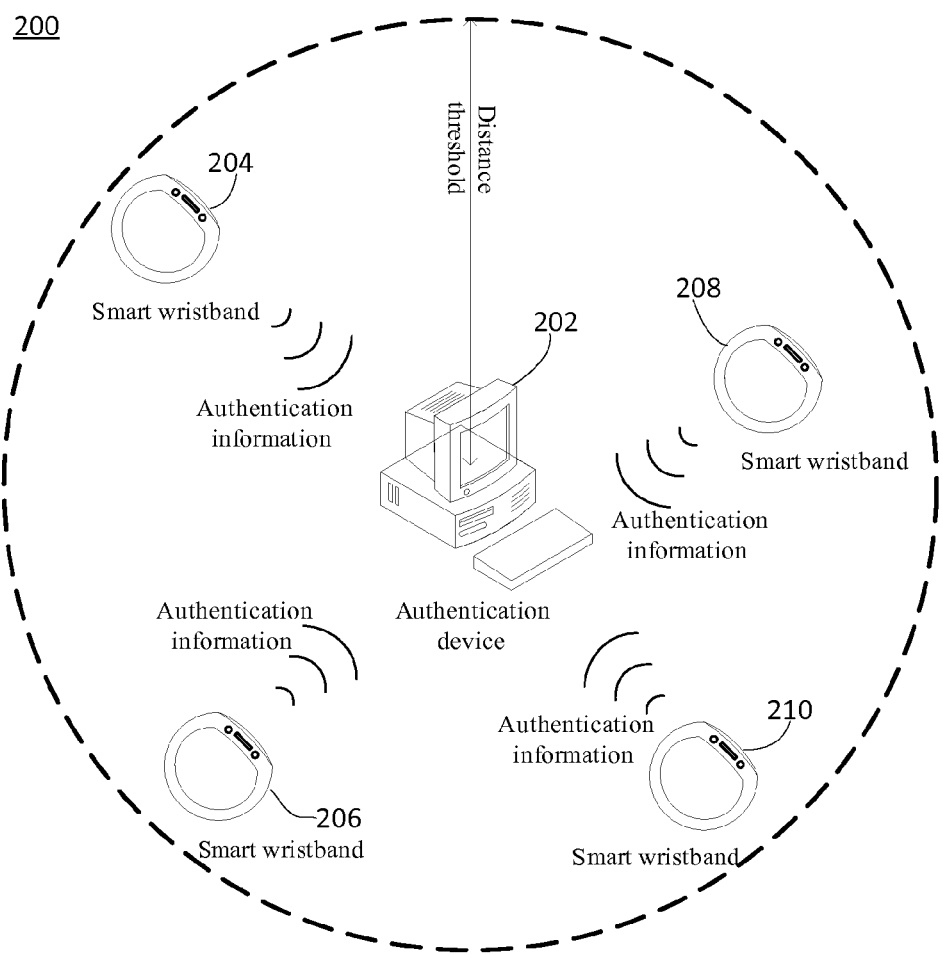
FIG. 2 is a schematic diagram showing an application scenario of unlocking administration authority according to an exemplary embodiment.

In one example embodiment, as shown in FIG. 2, regarding the determined distance between the authentication device and authenticated member devices (establishing a Bluetooth connection with the authentication device), the authentication device may determine in real time whether the distance between each of the authenticated member devices and the authentication device itself is smaller than the predetermined distance threshold, and determine the number of authenticated member devices that are within a predetermined distance threshold from the authentication device. When multiple administrators move close to the authentication device, carrying their member devices, and step into a circle area which takes the location of the authentication device as a center point and takes the predetermined distance threshold as a radius, it is possible to trigger the authentication device to unlock administration authority if the number of administrators is greater than or equal to the predetermined number threshold. For example, multiple administrators each carrying smart wristbands 204, 206, 208, and 210 respectively move close to the authentication device 202 in authentication system 200. Because the wristbands 204, 206, 208, and 210 are within a predetermined distance threshold from the authentication device 202, that is, within a dotted circle in FIG. 2, the number of the authenticated member devices that are within the range of the authentication device 202 is four. If the present number threshold is four or less in this example, the authentication device 202 unlocks administration authority. Then, the administrators may access to the system of the authentication device and perform corresponding operations. For example, after the authentication device completes a power-on self-test, it enters into an authentication page. At this moment, a certain number of administrators wearing smart wristbands move close to the authentication device, which may be triggered to automatically determine that identity authentication succeeds so as to log onto the system (i.e., the administration authority of the system is unlocked). This method may also be used to log onto an application in addition to logging onto a system.

Unlocking of administration authority may not be achieved unless the predetermined number threshold is equal to the quantity of authentication information in the authorized authentication information list (i.e., all authorized administrators are required to carry their member devices and get close to the authentication device). In other example embodiment, the predetermined number threshold may also be smaller than the quantity of authentication information in the authorized authentication information list, in which case, the predetermined number threshold may be a certain specified value, or be equal to product of a predetermined percentage (for example, 50%) and the quantity of authentication information in the authorized authentication information list, for example the number of segments or pieces of authentication information.

Optionally, after unlocking administration authority, the authentication device may record all terminals participating in this authentication. A corresponding treatment may be as below: it is recorded authenticated member devices that are located within the predetermined distance threshold from the authentication device.

In implementation, after the administration authority is unlocked, the authentication device may record authenticated member devices respectively having a determined distance to the authentication device that is smaller than the predetermined distance threshold, and may record information such as device identification of these authenticated member devices.

The embodiments of the present disclosure also provide a method for setting the authorized authentication information list, as below: the authorization device receives an authentication information setting request which carries authentication information to be set, and adds the authentication information to be set into the authorized authentication information list.

In implementation, the administrator may set the authorized authentication information list when the system of the authentication device is at an administration authority unlocking status. The function setting page of the system is provided with an option for setting the authorized authentication information list. After the option is selected, the system provides a setting page of the authorized authentication information list, in which an input box for adding authorization information is displayed. The administrator may input authentication information (i.e., authentication information to be set) of a member device to be authorized into the input box and then click the OK button. Then the authentication device will receive an authentication information setting request which carries the authentication information, and the authentication device may be triggered to add the authentication information into the authorized authentication information list. In the subsequent process, member devices storing the authentication information may participate in the unlocking process of the administration authority of the authentication device by means of the processing procedures in the above Step 101~103.

The embodiments of the present disclosure also provide a method for setting the distance threshold mentioned above, as below: the authorization device receives a distance setting request which carries a distance threshold to be set, and adjusts the predetermined distance threshold as the distance threshold to be set.

In implementation, in the authentication device, the predetermined distance threshold mentioned above may either be a default value of the system, or be adjusted by the administrator according to requirements. The administrator may set the predetermined distance threshold when the system of the authentication device is at an administration authority unlocking status. The function setting page of the system is provided with an option for setting the distance threshold. After the option is selected, the system provides the distance threshold setting page, in which a distance threshold input box is displayed. The administrator may input a new distance threshold (i.e., the distance threshold to be set) into the input box and then click the OK button. Then, the authentication device will receive a distance setting request which carries the distance threshold inputted by the administrator, and the authentication device may be triggered to adjust the predetermined distance threshold to the distance threshold inputted by the administrator.

The embodiments of the present disclosure also provide a method for setting the number threshold, concretely as below: the authorization device receives a number setting request which carries a number threshold to be set, and adjusts the predetermined number threshold as the number threshold to be set.

In implementation, in the authentication device, the predetermined number threshold mentioned above may either be a default value of the system, or be adjusted by the administrator according to requirements. The administrator may set the predetermined number threshold when the system of the authentication device is at an administration authority unlocking status. The function setting page of the system is provided with an option for setting the number threshold. After the option is selected, the system provides the number threshold setting page, in which a number threshold input box is displayed. The administrator may input a new number threshold (i.e., the number threshold to be set) into the input box and then click the OK button. Then, the authentication device will receive a number setting request which carries the number threshold inputted by the administrator, and the authentication device may be triggered to adjust the predetermined number threshold to the number threshold inputted by the administrator.

In addition to the above method for setting the number threshold as a fixed value, regarding the condition in which the above predetermined number threshold is equal to product of a preset percentage and the quantity of authentication information in the authorized authentication information list, a similar method may be adopted for setting the preset percentage. For example, the preset percentage may be adjusted from original 50% to 60% in order to improve the security of the system to a certain extent. In this way, it is possible to achieve fine adjustment of the system security and authentication convenience.

In the embodiments of the present disclosure, the authentication device receives authentication information sent by a plurality of member devices; performs a matching authentication of the authentication information; determines a distance between an authenticated member device and the authentication device. The authenticated member device is a member device which sent an authentication information that is matched with authentication information prestored in an authorized authentication information list. The authentication device determines the number of authenticated member devices that are located within a predetermined distance threshold from the authentication device, and unlocks local administration authority if the number of authenticated member devices that are located within a predetermined distance threshold from the authentication device reaches a predetermined number threshold. In this way, unlocking administration authority is available as long as a certain number of administrators carrying member devices come close to the authentication device, thus improving the flexibility of unlocking administration authority.

Embodiment III

Figure 3:
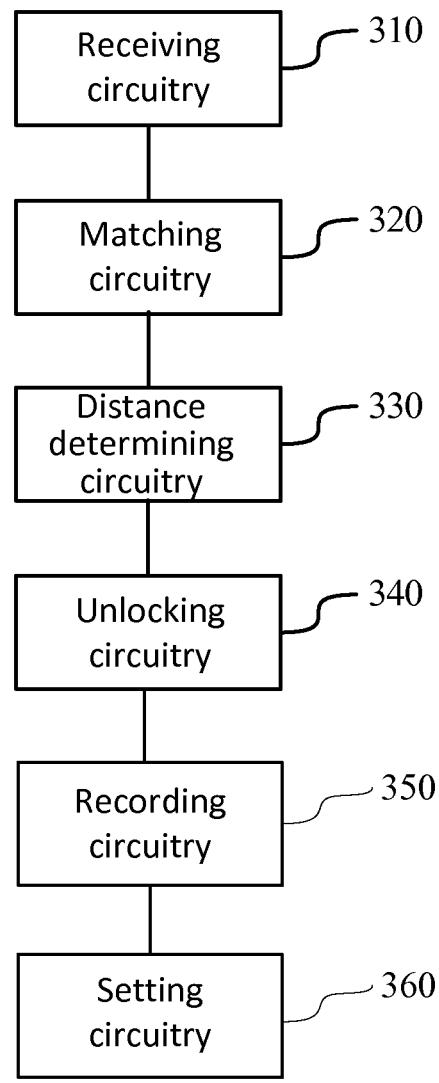
FIG. 3 is a block diagram showing a device for performing authentication according to an exemplary embodiment.

Based on the same technical concept, the embodiment of the present disclosure also provides a device for performing authentication. As shown in FIG. 3, the authentication device includes: receiving circuitry 310, matching circuitry 320, distance determining circuitry 330, unlocking circuitry 340, recording circuitry 350, and setting circuitry 360.

The receiving circuitry 310 is configured to receive authentication information sent by a plurality of member devices. The member device may be a mobile terminal or a wearable device.

The matching circuitry 320 is configured to perform a matching authentication of the authentication information. The matching circuitry 320 matches the authentication information sent from a member device with authentication information prestored in an authorized authentication information list.

The distance determining circuitry 330 is configured to determine a distance between an authenticated member device and the authentication device.

The unlocking circuitry 340 is configured to unlock local administration authority if the number of authenticated member devices that are located within a predetermined distance threshold from the authentication device reaches a predetermined number threshold.

In other example embodiment, the authentication information may include a device identification. The receiving circuitry 310 receives a Bluetooth connection message carrying respective device identifications sent by a plurality of member devices. The distance measuring circuitry 330 automatically replies to the Bluetooth connection message sent by the authenticated member device so as to establish a Bluetooth connection. As described above, the authenticated member device is a member device whose device identification is matched with device identification prestored in an authorized authentication information list. The distance measuring circuitry 330 determines the distance between a corresponding authenticated member device and the authentication device by means of the Bluetooth connection established.

The recording circuitry 350 is configured to record authenticated member devices that are located within the predetermined distance threshold from the authentication device after unlocking local administration authority.

Preferably, the predetermined number threshold is less than or equal to a quantity of authentication information in the authorized authentication information list.

The setting circuitry 360 is configured to receive an authentication information setting request which carries authentication information to be set, and add the authentication information to be set into the authorized authentication information list.

Preferably, the setting circuitry 360 receives a number setting request which carries a number threshold to be set, and adjusts the predetermined number threshold to the number threshold to be set.

With regard to the device in the above embodiment, detailed description of modes for performing operation of circuitry has been made in the embodiment related to the method, and no detailed illustration will be made herein.

In the embodiments of the present disclosure, the authentication device receives authentication information sent by a plurality of member devices, performs a matching authentication of the authentication information, and determines a distance between an authenticated member device and the authentication device. The authenticated member device is a member device which sent the authentication information that is matched with authentication information prestored in an authorized authentication information list. Then, the authentication device unlocks local administration authority if the number of authenticated member devices that are located within a predetermined distance threshold from the authentication device reaches a predetermined number threshold. In this way, unlocking administration authority is available as long as a certain number of administrators carrying member devices get close to the authentication device, thus improving the flexibility of unlocking administration authority.

It should be explained that when the device for unlocking administration authority provided in the above embodiments unlocks administration authority, it is merely illustrated by partition of above functional circuitry. In actual application, the above allocated functions may be implemented with different functional circuitry according to actual needs. That is, the inner structure of the device may be divided into different functional circuitry to accomplish part or all of the functions described as above. In addition, with respect to the device for unlocking administration authority provided by the above embodiments belonging to the same conception as the embodiments of the method for unlocking administration authority, the implementations have been described in detail in the foregoing method embodiments, and thus, they are not elaborated any more herein.

Embodiment IV

Figure 4:
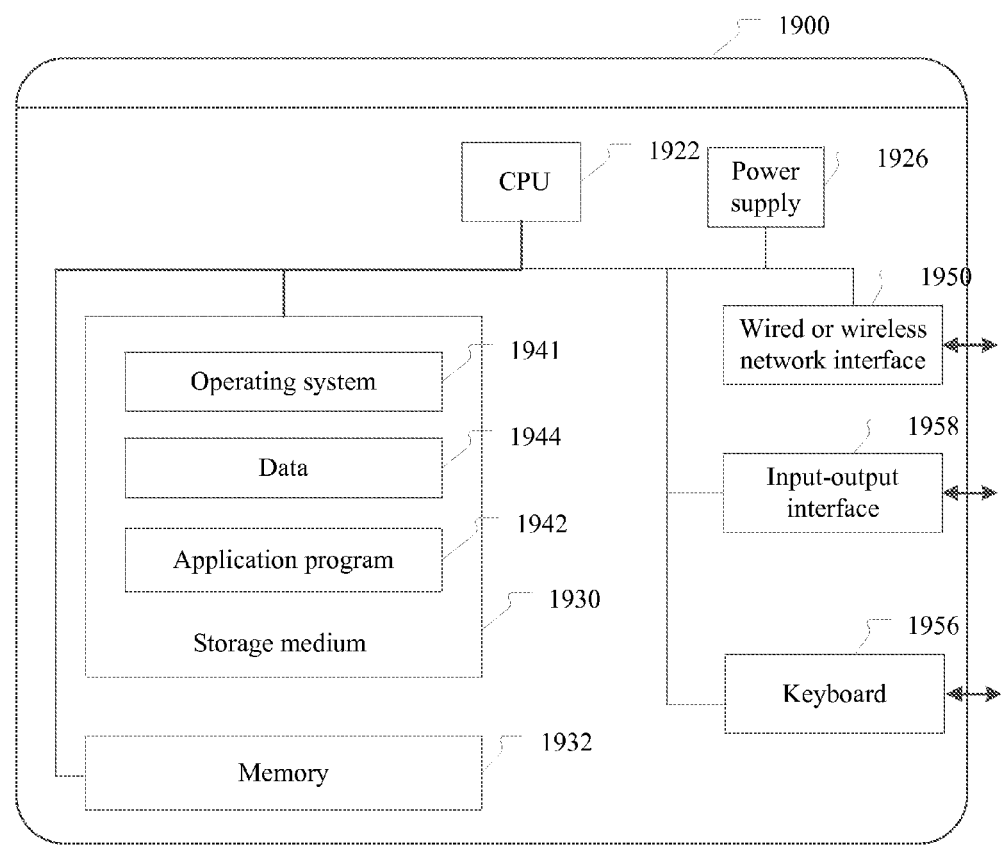
FIG. 4 is a block diagram showing a device for performing authentication according to an exemplary embodiment.

FIG. 4 is a block diagram of the authentication device according to the embodiment of the present disclosure. The authentication device 1900 may be relatively largely different due to different configurations or properties, and may include one or more CPUs (central processing unit) 1922 (e.g., one or more processors) and a memory 1932, one or more storage media 1930 storing application program 1942 or data 1944 (e.g., one or more mass storage devices). The storage medium 1930 and the memory 1932 may store data temporarily or permanently. The program stored in the storage medium 1930 may include one or more modules (not shown in this drawing), each of which may include a series of instruction operations in the authentication device. The CPU 1922 may be configured to communicate with the store medium 1930, and a series of instruction operations in the storage medium 1930 are executed on the authentication device 1900.

The authentication device 1900 may also include one or more power sources 1926, one or more wired or wireless network interfaces 1950, one or more input-output interfaces 1958, one or more keyboards 1956, and/or one or more operating systems 1941 such as Windows Server™, Mac OS X™, Unix™, Linux™, FreeBSD™ and the like.

In the present embodiment, the authentication device 1900 may also include a memory, and one or more programs stored in the memory. The one or more programs are executed by one or more processors, and include instructions configured to perform a method includes the following operations: receiving authentication information sent by a plurality of member devices; performing a matching authentication of the authentication information to authenticate a member device; determining a distance between an authenticated member device and the authentication device; and unlocking local administration authority if the number of authenticated member devices that are located within a predetermined distance threshold from the authentication device reaches a predetermined number threshold.

The step of receiving authentication information sent by a plurality of member devices may include receiving a Bluetooth connection message carrying respective device identifications sent by a plurality of member devices. The step of determining a distance between an authenticated member device and the authentication device (wherein the authenticated member device being a member device which sent the authentication information that is matched with authentication information prestored in an authorized authentication information list) may include: automatically replying to the Bluetooth connection message sent by the authenticated member device so as to establish a Bluetooth connection; and determining the distance between the corresponding authenticated member device and the authentication device by means of the Bluetooth connection established.

Optionally, after unlocking local administration authority, the method also may include: recording authenticated member devices that are located within the predetermined distance threshold from the authentication device.

Optionally, the predetermined number threshold is less than or equal to a quantity of authentication information in the authorized authentication information list.

Optionally, the method may also include: receiving an authentication information setting request which carries authentication information to be set; and adding the authentication information to be set into the authorized authentication information list.

Optionally, the method may also include: receiving a number setting request which carries a number threshold to be set; and adjusting the predetermined number threshold to the number threshold to be set.

In the embodiments of the present disclosure, the authentication device receives authentication information sent by a plurality of member devices; performs a matching authentication of the authentication information; determines a distance between an authenticated member device and the authentication device; and unlocks local administration authority if the number of authenticated member devices that are located within a predetermined distance threshold reaches a predetermined number threshold. In this way, unlocking administration authority is available as long as a certain number of administrators carrying member devices get close to the authentication device, thus improving the flexibility of unlocking administration authority.

Other embodiments of the invention will be apparent to those skilled in the art from consideration of the specification and practice of the invention disclosed here: This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for unlocking administration authority in a computer system comprising:
   receiving, at an authentication device, authentication information sent from a plurality of member devices, the member devices comprising a mobile terminal or a wearable device, wherein the authentication information is encrypted using an encryption key stored in each of the member devices;
   authenticating a member device from among the member devices by matching the authentication information from the member device with authentication information prestored in an authorized authentication information list;
determining a distance between an authenticated member device from among the member devices, and the authentication device;
determining a number of authenticated member devices from among the member devices that are located within a predetermined distance threshold from the authentication device;
unlocking local administration authority of the authentication device when the number of authenticated member devices reaches a predetermined number threshold; and
after unlocking the local administration authority, recording, by the authentication device, identifications of all of the authenticated member devices that participated in the unlocking.

2. The method of claim 1, wherein the authentication information comprises a device identification, wherein receiving, at the authentication device, authentication information sent from a plurality of member devices comprises:
receiving, at the authentication device, a Bluetooth message carrying respective unique device identifications sent from each of the plurality of member devices.

3. The method of claim 1, further comprising:
decrypting the authentication information using a locally decryption key stored in the authentication device.

4. The method of claim 1, further comprising:
triggering the member device to send authentication information to the authentication device when a physical button on the member device is clicked, wherein the predetermined number threshold is less than or equal to a predetermined number of segments of the authentication information in the authorized authentication information list.

5. The method of claim 1, further comprising:
receiving, at the authentication device, an authentication information setting request which carries authentication information to be set; and
adding, at the authentication device, the authentication information to be set into the authorized authentication information list before receiving authentication information sent from the plurality of member devices.

6. The method of claim 1, further comprising:
receiving, at the authentication device, a number setting request which carries a number threshold to be set; and
adjusting, at the authentication device, the predetermined number threshold to the number threshold to be set.

7. An authentication device for performing authentication, comprising:
a processor; and
a memory configured to store instructions executable by the processor,
wherein the processor is configured to:
receive authentication information sent from a plurality of member devices, the member devices comprising a mobile terminal or a wearable device, wherein the authentication information is encrypted using an encryption key stored in each of the member devices;
authenticating a member device from among the member devices by matching the authentication information from the member device with authentication information prestored in an authorized authentication information list;
determine a distance between an authenticated member device from among the member devices, and the authentication device;
determine a number of authenticated member devices from among the member devices that are located within a predetermined distance threshold from the authentication device;
unlock local administration authority when the number of authenticated member devices reaches a predetermined number threshold; and
after unlocking the local administration authority, record, in the memory of the authentication device, identifications of all of the authenticated member devices that participated in the unlocking.

8. The authentication device of claim 7, wherein the authentication information comprises a device identification, and the processor is further configured to:
receive a Bluetooth message carrying respective unique device identifications sent from each of the plurality of member devices;
automatically reply to the Bluetooth message sent from the authenticated member device so as to establish a Bluetooth connection; and determine the distance between the authenticated member device and the authentication device based on the Bluetooth connection established.

9. The authentication device of claim 7, wherein the processor is further configured to:
decrypt the authentication information using a locally decryption key stored in the authentication device.

10. The authentication device of claim 7, wherein the predetermined number threshold is less than or equal to a number of segments of the authentication information in the authorized authentication information list.

11. The authentication device of claim 7, wherein the processor is further configured to:
receive an authentication information setting request which carries authentication information to be set; and
add the authentication information to be set into the authorized authentication information list.

12. The authentication device of claim 7, wherein the processor is further configured to:
receive a number setting request which carries a number threshold to be set; and
adjust the predetermined number threshold to the number threshold to be set.

13. An authentication device comprising:
circuitry configured to receive authentication information sent from a plurality of member devices, the member devices comprising a mobile terminal or a wearable device, wherein the authentication information is encrypted using an encryption key stored in each of the member devices;
circuitry configured to match the authentication information sent from a member device from among the member devices with authentication information prestored in an authorized authentication information list to authenticate the member device;
circuitry configured to determine a distance between an authenticated member device from among the member devices, and the authentication device; and
circuitry configured to unlock local administration authority when a number of authenticated member devices from among the member devices from which the distances to the authentication device are smaller than a predetermined distance threshold, reaches a predetermined number threshold; and circuitry configured to record identifications of all of the authenticated member devices that participated in the unlocking, after unlocking the local administration authority.

14. The authentication device of claim 13, further comprising:
circuitry configured to record the authenticated member devices from which the distances to the authentication device are smaller than the predetermined distance threshold.

15. The authentication device of claim 13, further comprising:
circuitry configured to receive an authentication information setting request which carries authentication information to be set, and add the authentication information to be set into the authorized authentication information list.

16. The authentication device of claim 13, further comprising:
circuitry configured to receive a number setting request which carries a number threshold to be set, and adjust the predetermined number threshold to the number threshold to be set.

17. The method of claim 2, further comprising:
receiving, at the authentication device, an authentication information setting request including authentication information to be set;
adding, at the authentication device, the authentication information to be set into the authorized authentication information list before receiving authentication information sent from the plurality of member devices;
receiving, at the authentication device, a number setting request including a number threshold to be set; and
adjusting, at the authentication device, the predetermined number threshold to the number threshold to be set.

18. The method of claim 17, wherein determining a distance between the authenticated member device and the authentication device comprises:
automatically replying to the Bluetooth message sent from the authenticated member device so as to establish a Bluetooth connection; and determining the distance between a corresponding authenticated member device and the authentication device based on the Bluetooth connection established.

19. The method of claim 17, further comprising:
decrypting the authentication information using a locally decryption key stored in the authentication device.

20. The method of claim 17, wherein the predetermined number threshold is less than or equal to a predetermined number of segments of the authentication information in the authorized authentication information list.

* * * * *